(12) United States Patent
Liu

(10) Patent No.: US 6,594,045 B2
(45) Date of Patent: *Jul. 15, 2003

(54) FLEXIBLE OPTICAL NETWORK ARCHITECTURE AND OPTICAL ADD/DROP MULTIPLEXER/DEMULTIPLEXER THEREFOR

(75) Inventor: Wen Liu, Nepean (CA)

(73) Assignee: Tropic Networks, Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/013,676

(22) Filed: Dec. 13, 2001

(65) Prior Publication Data

US 2002/0197007 A1 Dec. 26, 2002

Related U.S. Application Data

(63) Continuation-in-part of application No. 09/953,952, filed on Sep. 18, 2001.
(60) Provisional application No. 60/292,589, filed on May 23, 2001.

(51) Int. Cl.$^7$ ................................................ H04J 14/00
(52) U.S. Cl. ...................... 359/118; 359/115; 359/119; 359/120; 359/121
(58) Field of Search ............................... 359/115, 124, 359/118; 385/24

(56) References Cited

U.S. PATENT DOCUMENTS 5,530,575 A * 6/1996 Acampora et al. .......... 359/128
5,612,968 A * 3/1997 Zah .............................. 372/50
5,930,014 A * 7/1999 Yamamoto .................. 359/118
5,943,150 A * 8/1999 Deri et al. ................... 359/133

OTHER PUBLICATIONS

"The Rainbow–II Gigabit Optical Network", Hall, et al, IEEE Journal on Selected Areas in Communications, Vol. 14, No. 5, Jun. 1996.
"Node Architecture and Protocol of a Packet–Switched Dense WDMA Metropolitan Area Network", Chan, et al, Journal of Lightwave Technology, vol. 17, No. 11, Nov. 1999.

* cited by examiner

Primary Examiner—Audrey Chang
Assistant Examiner—Denise S. Allen
(74) Attorney, Agent, or Firm—Victoria Donnelly

(57) ABSTRACT

The invention describes an optical network architecture which uses a limited number of wavelength channels while providing flexible connections between the network nodes. Each node in the network deploys a fixed wavelength transmitter and a fixed wavelength receiver, whose wavelengths are misarranged so that a set of wavelengths of the transmitter differs from the set of wavelengths of the receiver, and wavelengths of transmitters and receivers at different nodes are arranged so that for any pair of nodes there is at least one common wavelength which is the same for one of the transmitter and receiver at one node and one of the respective receiver and transmitter at the other node, thus providing a direct connection between the nodes. The corresponding structure of the optical add/drop multiplexer/demultiplexer for use at the network node, and method of providing direct connections between the nodes, are also provided.

24 Claims, 6 Drawing Sheets

FLEXIBLE OPTICAL NETWORK ARCHITECTURE AND OPTICAL ADD/DROP MULTIPLEXER/DEMULTIPLEXER THEREFOR

RELATED APPLICATION

This patent application is a Continuation-in-part of U.S. patent application to Wen Liu entitled "Flexible Optical Network Architecture", filed on Sep. 18, 2001 as Ser. No. 09/953,952 which claims benefit of provisional application 60/292,589 filed May 23, 2001.

FIELD OF THE INVENTION

This invention relates to optical networks, and in particular, to flexible optical network architecture and add/drop multiplexer therefor, which provide flexible connection between the network nodes.

BACKGROUND OF THE INVENTION

Optical Packet Networks (OPN) typically have Synchronous Optical Network (SONET) ring architecture with DWDM techniques integrated inside the rings to increase the network capacity and to support multi-ring connections and the multiple services requests. Although the OPN management can control the traffic flow through the network, the ability to deliver bandwidth on demand anywhere in the network is not always possible. Over-provisioning of the network can partially solve this problem, but only at the expense of the increase of the network costs and less effective utilization of the network resources. Additionally, the update and re-provisioning of the equipment has to be done quickly and almost in real time, which is definitely not the reality of today.

Optical communications systems have been employing different network architectures to provide required flexible connections between the network nodes and bandwidth on demand services. For example, in a fixed wavelength network, where each node transmits and receives channels at fixed wavelengths, the transmitted/received wavelengths are the same for those nodes that communicate with each other. This network architecture requires multiple transmitters and receivers at each node, or otherwise it does not have flexibility to provide multiple connections between different nodes. It is also costly and inefficient to upgrade such a network, e.g. to accommodate new channels or to establish new connections, as it will require the addition of extra transmitters/receivers at the nodes. As a result, with this network architecture, it is difficult to satisfy the ever-increasing demand for network growth.

To overcome the limitations of fixed wavelength networks, it has been suggested to use tunable wavelength transmitters and/or receivers to provide higher flexibility of the network connections. For example, in a Fixed-tuned Transmitter and Tunable Receiver (FTTR) approach, each node is assigned with a specific wavelength for data transmission, while a receiver is a tunable device capable of receiving one of several data streams at different wavelengths generated by the transmitters. To transmit data from node j to node i, signalling messages have to be first sent to inform node i to tune its receiver to wavelength $\lambda_j$ for data reception. FTTR network architecture has been deployed, e.g. in a European experimental system named Rainbow-II networks and published in an article by Eric Hall et al. entitled "The Rainbow-II Gigabit Optical Networks", IEEE Journal of Selected Areas in Communications, Volume 14, No. 5, June 1996, p.814–823.

Another approach, where tunable devices are used at network nodes, is known as Tunable Transmitter and Fix-Tuned Receiver (TTFR) network architecture. In the TTFR approach, each node is assigned with a fixed wavelength for data reception, where the receivers at node i are only responding to the wavelength channel i ($\lambda_i$). Nodes intending to send data to node i have to tune their transmitters to wavelength $\lambda_i$. TTFR architecture has been described, e.g. in the article to Chun-Kit Chan et al. entitled "Node Architecture and Protocol of a Packet Switched Dense WDMA metropolitan Area Network", Journal of Lightwave Technology, Vol. 17, No. 11, November 1999, pp. 2208–2218, where TTFR concept has been applied to DWDM networks.

The major drawback of tunable devices is their high cost and low reliability compared to the fixed wavelength devices. Additionally, the process of wavelength tuning has finite response time, it is sensitive to temperature and/or current changes and therefore requires stabilization.

Thus, network architecture using fixed wavelength devices can provide quick and reliable connections, but fail to provide flexibility and cost effective solutions to accommodate network growth and utilization. In contrast, known network architectures using tunable devices can provide flexibility of network connections, but tend to be expensive, less reliable and more complicated in exploitation and maintenance.

Accordingly, there is a need in industry for the development of an alternative optical network and node architecture, which would deliver inexpensive, flexible and reliable network connections.

SUMMARY OF THE INVENTION

Therefore there is an object of the invention to provide an optical network architecture which would provide flexibility of the network connections while being simple and cost effective.

According to one aspect of the invention there is provided an optical network, comprising:

a plurality of N nodes;

each node has a transmitter for transmitting a set of "$n_1$" wavelengths (transmitter set), and a receiver for receiving a set of "$n_2$" wavelengths (receiver set), the transmitter and receiver sets are misarranged so as to differ by at least one wavelength; and the wavelengths of transmitters and receivers at different nodes are arranged so that for any pair of nodes there is at least one common wavelength which is the same for the transmitter at one node and the receiver at the other node, thus providing a direct connection between the nodes.

Beneficially, it is arranged that for any pair of nodes there are at least two common wavelengths, the first and second common wavelengths, the first wavelength being the same for the transmitter at one node and the corresponding receiver at the other node in the pair, and the second wavelength being the same for the receiver at one node and the corresponding transmitter at the other node in the pair.

Conveniently, the total number of the wavelengths used in the network is equal to "$n_1+n_2$", and the total number of nodes is equal to $N=(n_1+n_2)!/(n_1!n_2!)$.

The transmitter set and receiver set may have different number of wavelengths, i.e. $n_1 \neq n_2$, and some or all of the wavelengths of the transmitter set may differ from the wavelengths of the receiver set.

Alternatively, the transmitter set and receiver set may have same number of wavelengths, i.e. $n_1=n_2=n$, and some or all of the wavelengths of the transmitter set differ from the wavelengths the receiver set.

The number "$n_1$" of the wavelengths in the transmitter set may be the same for all nodes, or alternatively the number "$n_1$" of wavelengths in the transmitter set may vary for different nodes.

According to another aspect of the invention there is provided an optical network, comprising:

a plurality of nodes, each node having a transmitter for transmitting a set of "n" wavelengths, and a receiver for receiving another set of "n" wavelengths, the set of wavelengths of the transmitter being different from the set of wavelengths of the receiver;

wavelengths of transmitters and receivers at different nodes being arranged so that for any pair of nodes there is at least one common wavelength which is the same for one of the transmitter and receiver at one node and one of the respective receiver and transmitter at the other node, thereby providing a uni-directional, direct connection between the nodes.

Conveniently, wavelengths of transmitters and receivers at different nodes can be arranged so that for any pair of nodes in the network there are at least two common wavelengths, the first and second common wavelengths, the first wavelength is the same for the transmitter at one node and the corresponding receiver at the other node in the pair, and the second wavelength is the same for the receiver at one node and the corresponding transmitter at the other node in the pair, thereby providing a bi-directional direct connection between the nodes.

Conveniently, the total number of the wavelengths used in the network is equal to "2n", the total number of nodes is equal to N=(2n)!/(n!n!), and the number of common wavelengths for any pair of nodes is not exceeding "n−1".

The number of wavelengths used by transmitters or receivers at each node may be conveniently equal to n=2,3, 4 to 10, or any other number of wavelengths, which would provide required connection between the nodes in the network.

Preferably, transmitters and receivers at the network nodes are fixed wavelength devices, which generate or receive signals at fixed wavelengths. Alternatively, some or all of the transmitters and/or receivers may be tunable or switchable wavelength devices, which allow tuning or switching of the wavelength within a required wavelength range.

The network architecture described above can be applied to various types of optical networks, e.g. a wavelength division multiplexing (WDM) network, including ring, multi-ring, mesh, bus and star network topologies.

According to another aspect of the invention there is provided a node for an optical network, comprising a transmitter for transmitting a set of "$n_1$" wavelengths, and a receiver for receiving another set of "$n_2$" wavelengths, the set of wavelengths of the transmitter differing from the set of wavelengths of the receiver by at least one wavelength;

the wavelengths of the transmitter and receiver at the said node are arranged so that for any pair of nodes in the network, where the said node is one of the two nodes in the pair, there is at least one common wavelength which is the same for one of the transmitter and receiver at the said node and one of the respective receiver and transmitter at the other node in the pair.

Conveniently, the wavelengths of the transmitter and receiver at the node are arranged so that for any pair of nodes in the network, where the said node is one of the two nodes in the pair, there are at least two common wavelengths, the first and second common wavelengths, the first wavelength is the same for the transmitter at the said node and the corresponding receiver at the other node in the pair, and the second wavelength is the same for the receiver at the said node and the corresponding transmitter at the other node in the pair.

Conveniently, $n_1=n_2=n$, and the set of wavelengths of the transmitter is different from the set of wavelengths of the receiver.

Advantageously, the node described above further comprises an optical add/drop multiplexer/demultiplexer (OADM) including means for dropping wavelengths from the network at the node and means for adding wavelengths to the network from the node. Conveniently, the means for dropping wavelengths includes means for dropping one wavelength at a time, comprising a set of "$n_2$" optical filters adjusted to the wavelengths of the receiver, and the means for adding wavelengths includes means for adding one wavelength at a time, comprising another set of "$n_1$" optical filters or optical couplers suitable to operate at the wavelengths of the transmitter. Optionally, a node may further comprise a wavelength converter to provide indirect connection between the nodes through other nodes in the network.

According to yet another aspect of the invention there is provided an optical add/drop multiplexer/demultiplexer for a node described above, comprising:

means for dropping wavelengths from the network to the node comprising a set of "$n_2$" optical filters suitable for operation at the wavelengths of the receiver set; and means for adding wavelengths to the network from the node comprising one of the following:

a set "$n_1$" optical filters suitable for operation at the wavelengths of the transmitter set; and a set of "$n_1$" optical couplers suitable for operation at the wavelengths of the transmitter set.

According to yet another aspect of the invention there is provided a method of providing direct connections between the nodes in an optical network having a plurality of nodes, the method comprising the steps of:

for each node, providing a transmitter for transmitting a set of "$n_1$" wavelengths, and a receiver for receiving another set of "$n_2$" wavelengths, and selecting the wavelengths of the transmitter and the receiver so as to differ by at least one wavelength;

selecting wavelengths of transmitters and receivers at different nodes so that for any pair of nodes there is at least one common wavelength which is the same for one of the transmitter and the receiver at one node, and one of the respective receiver and transmitter at the other node, thus providing a direct connection between the nodes.

Beneficially, it is selected so that $n_1=n_2=n$, the wavelengths of the transmitter set is different from the wavelengths of the receiver set. Advantageously, the step of selecting the wavelengths of transmitters and receivers at different nodes is performed so as to provide that for any pair of nodes there are at least two common wavelengths, the first and second common wavelengths, the first wavelength is the same for the transmitter at one node and the corresponding receiver at the other node in the pair, and the second wavelength is the same for the receiver at one node and the corresponding transmitter at the other node in the pair. Conveniently, the method described above further comprises the step of arranging the total number of wavelengths used in the network to be equal to "2n".

Conveniently, the optical network described above, can be built as an overlay of a multi-ring network so that the nodes of the optical network are the nodes in the multi-ring network, thereby providing a flexible connection between the nodes in the multi-ring network.

The network architecture described above has the following advantages. It requires less wavelength resources to support the same number of nodes in the network than other known solutions, and it is more cost effective and reliable.

BRIEF DESCRIPTION OF THE DRAWINGS

The invention will now be described in greater detail with reference to the attached drawings, in which.

DETAILED DESCRIPTION OF THE PREFERRED EMBODIMENT

Figure 1:
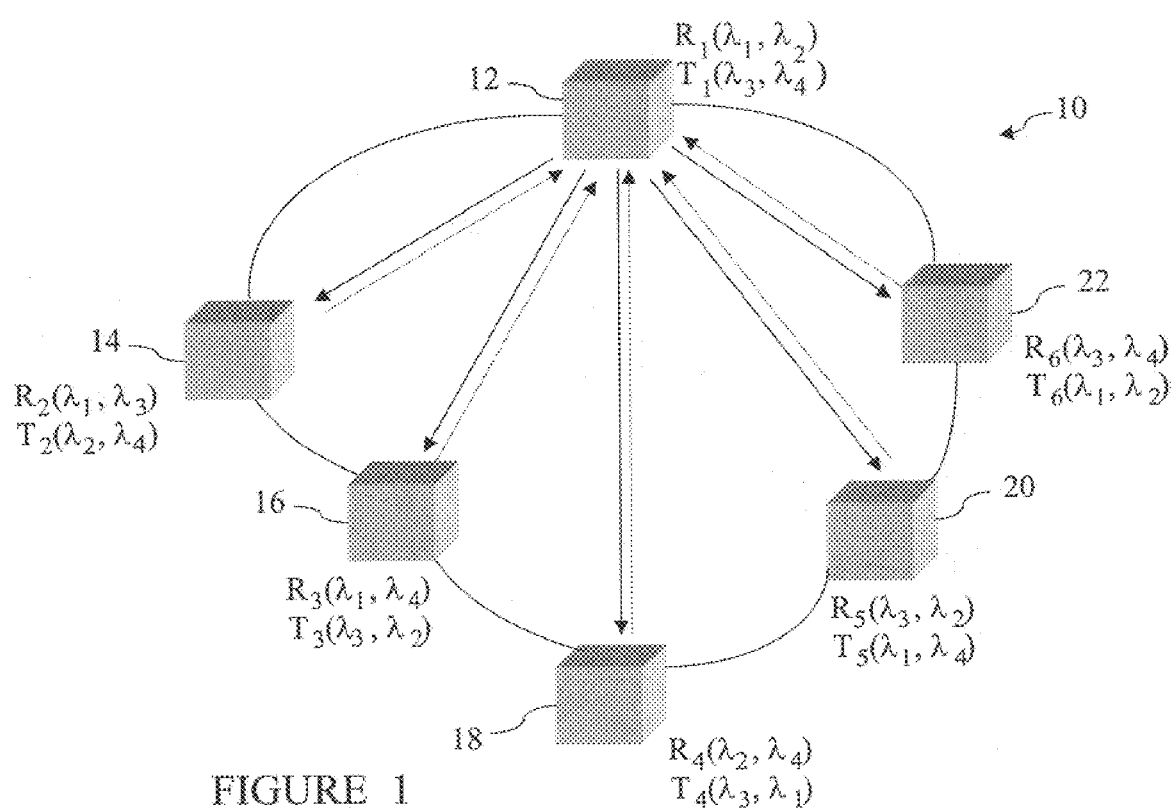
FIG. 1 is a diagram illustrating a network architecture and connections between the nodes according to a first embodiment of the invention.

A schematic diagram of a network 10 according to the first embodiment of the invention is shown in FIG. 1. The network 10 includes six nodes designated by reference numerals 12, 14, 16, 18, 20 and 22 respectively. Each node has a transmitter for transmitting a set of $n_1=2$ wavelengths, and a receiver for receiving another set of $n_2=2$ wavelengths, and it is conveniently selected that $n_1=n_2=n=2$, and the set of wavelengths of the transmitter being different from the set of wavelengths of the receiver. The total number of wavelengths used by transmitters and receivers at each node is equal to $2n=4$ ($\lambda_1, \lambda_2, \lambda_3, \lambda_4$), which is also equal to the total number of wavelengths used in the network 10. Further to the above, the wavelengths of transmitters and receivers at the nodes are assigned in such a manner so that for any pair of nodes in the network there are at least two common wavelengths, the first and second common wavelengths, the first wavelength is the same for the transmitter at one node and the corresponding receiver at the other node in the pair, and the second wavelength is the same for the receiver at one node and the corresponding transmitter at the other node in the pair, thereby providing a direct bi-directional connection between the nodes.

FIG. 1 and Table 1 illustrate the assignment of four wavelengths ($\lambda_1, \lambda_2, \lambda_3, \lambda_4$) to the transmitters $T_x$ and receivers $R_x$ at the nodes, where index x=1, 2, . . . 6 relates to the nodes 12 to 22 respectively. Namely, the node 12 has a transmitter $T_1$ ($\lambda_3, \lambda_4$) and a receiver $R_1$ ($\lambda_1, \lambda_2$), whose corresponding wavelengths are shown in brackets, node 14 has $T_2$ ($\lambda_2, \lambda_4$) and $R_2$ ($\lambda_1, \lambda_3$), node 16 has $T_3$ ($\lambda_3, \lambda_2$) and $R_3$ ($\lambda_1, \lambda_4$) node 18 has $T_4$ ($\lambda_3, \lambda_1$) and $R_4$ ($\lambda_2, \lambda_4$), node 20 has $T_5$ ($\lambda_1, \lambda_4$) and $R_5$ ($\lambda_3, \lambda_2$), and node 22 has $T_6$ ($\lambda_1, \lambda_2$) and $R_6$ ($\lambda_3, \lambda_4$) respectively. Connections between the nodes are made through their common wavelengths, e.g. node 12 provides a bi-directional connection to the other five nodes 14, 16, 18, 20 and 22 in the network by receiving signals on wavelengths (channels) $\lambda_1$ & $\lambda_2$ and transmitting signals on wavelengths (channels) $\lambda_3$ & $\lambda_4$. In more detail, referring to the connection scheme of FIG. 1, node 12 would receive signals on wavelengths $\lambda_1$ and $\lambda_2$, namely on wavelength $\lambda_1$ from nodes 18, 20 and 22, and on wavelength $\lambda_2$ from nodes 14 and 16. On the transmission side, node 12 would send signals on wavelengths $\lambda_3$ and $\lambda_4$, namely, on wavelength $\lambda_3$ to nodes 14, 20 and 22, and on wavelength $\lambda_4$ to nodes 16 and 18. Thus, for nodes 12 and 14 the common wavelengths are $\lambda_2$ and $\lambda_3$, for nodes 12 and 16 the common wavelengths are $\lambda_4$ and $\lambda_2$, for nodes 12 and 18—$\lambda_4$ and $\lambda_1$, for nodes 12 and 20—$\lambda_3$ and $\lambda_1$, and for nodes 12 and 20—$\lambda_{3,4}$ and $\lambda_{1,2}$. Connections between other nodes in the network are established in a similar manner and illustrated in Table 1.

Thus, the network 10 uses combinations of four wavelengths by two at each node to provide quick and flexible connections in a six-node network in the manner described above.

TABLE 1

Flexible connections between 6 nodes

| Node | Receiver | Transmitter | Illustration of Connections | Receiver | Transmitter |
|---|---|---|---|---|---|
| 12 | $R_1$ ($\lambda_1, \lambda_2$) | $T_1$ ($\lambda_3, \lambda_4$) | | $R_1$ ($\lambda_1, \lambda_2$) | $T_1$ ($\lambda_3, \lambda_4$) |
| 14 | $R_2$ ($\lambda_1, \lambda_3$) | $T_2$ ($\lambda_2, \lambda_4$) | | $R_2$ ($\lambda_1, \lambda_3$) | $T_2$ ($\lambda_2, \lambda_4$) |
| 16 | $R_3$ ($\lambda_1, \lambda_4$) | $T_3$ ($\lambda_2, \lambda_3$) | | $R_3$ ($\lambda_1, \lambda_4$) | $T_3$ ($\lambda_2, \lambda_3$) |
| 18 | $R_4$ ($\lambda_2, \lambda_4$) | $T_4$ ($\lambda_1, \lambda_3$) | | $R_4$ ($\lambda_2, \lambda_4$) | $T_4$ ($\lambda_1, \lambda_3$) |
| 20 | $R_5$ ($\lambda_2, \lambda_3$) | $T_5$ ($\lambda_1, \lambda_4$) | | $R_5$ ($\lambda_2, \lambda_3$) | $T_5$ ($\lambda_1, \lambda_4$) |
| 22 | $R_6$ ($\lambda_3, \lambda_4$) | $T_6$ ($\lambda_1, \lambda_2$) | | $R_6$ ($\lambda_3, \lambda_4$) | $T_6$ ($\lambda_1, \lambda_2$) |

Figure 2:
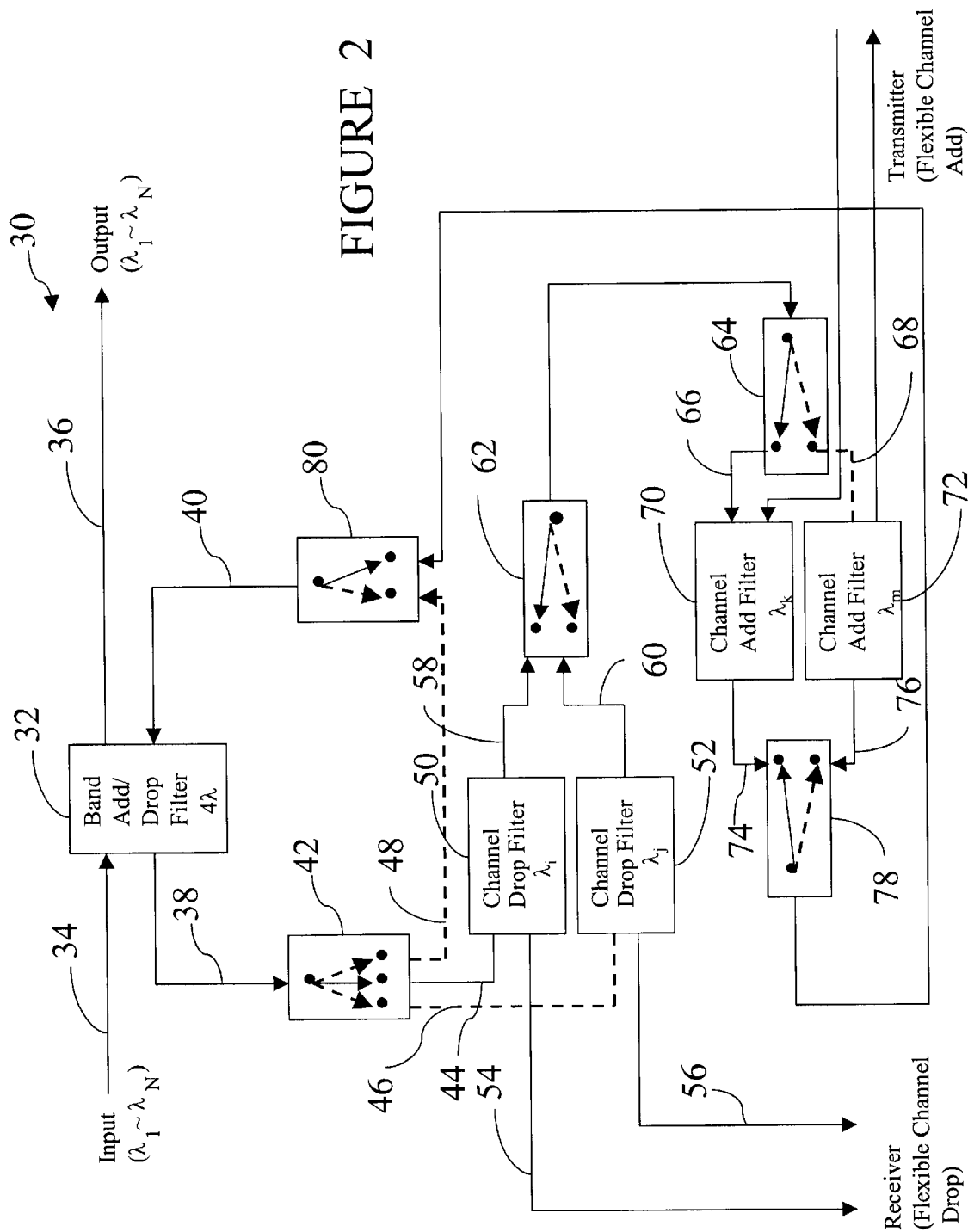
FIG. 2 is a block diagram of one form of an optical add/drop multiplexer/demultiplexer (OADM) used at the node of the network of FIG. 1.

A block diagram of the OADM 30 used at the node of the network 10 is illustrated in FIG. 2. It includes a band add/drop filter 32 for receiving an incoming band of four wavelength channels entering the node, transmitting the band to the other nodes (not shown), and routing the received band inside the node for further processing. The filter 32 has two inputs and two outputs, namely an input 34 for receiving the band, an output 36 for transmitting the band outside the node, an output 38 for dropping the band at the node, and an input 40 for adding the processed band to the filter 32 and further to the network 10.

The output 38 of the band filter 32 is connected to a three-way switch 42 having three outputs 44, 46 and 48. The first output 46 of the switch 42 provides connection of the switch to an optical channel drop filter 50, which is adjusted to one of the wavelengths of the receiver at the node, e.g. to wavelength $\lambda_1$ at node 12. The second output 46 of the three-way switch 42 is connected to another optical channel drop filter 52, which is adjusted to the other wavelength of the receiver at the node, e.g. to wavelength $\lambda_2$ at node 12. Conveniently, the total number of the optical channel drop filters required at each node is equal to the number of the wavelengths utilized by the receiver at the node. Each of the filters 50 and 52 has two outputs, the first pair of the filters' outputs 54 and 56 is connected to corresponding receiver(s) at the node, e.g. to the receiver $R_1(\lambda_1, \lambda_2)$ at node 12, and the other pair of the filters' outputs 58 and 60 is connected to a two-way switch 62. The switch 62 combines the two wavelengths dropped at filters 50 and 52 and sends them to another two-way switch 64 whose outputs 66 and 68 are respectively connected to optical channel add filters 70 and 72. The filters 70 and 72 add channels transmitted at the node, being respectively adjusted to the wavelengths of the transmitter at the node, e.g. filter 70 is adjusted to wavelength $\lambda_3$, and filter 72 to wavelength $\lambda_4$ at node 12. The respective outputs 74 and 76 of filters 70 and 72 are connected to another two-way switch 78, which combines the dropped and added channels and sends them to yet another two-way switch 80. Additionally, the switch 80 receives the channel(s) intended to pass through the node from the output 48 of the switch 42, thus completing the formation of the required band of four wavelengths to be sent to the network through the band filter 32. Conveniently, the total number of optical channel add filters required at the node is equal to the number of wavelengths used by the transmitter at the node.

The OADM 30 operates in the following manner. The band of four (2n) wavelengths is selected by the band add/drop filter 32 and sent to the three-way switch 42 for further selection of individual channels, which are supposed to be dropped at the node, and those channels, which are intended to pass through the node and to be returned back to the network. Channels to be dropped are filtered by corresponding channel drop filters 50 and 52 and further sent to the corresponding receivers. Channels to be added at the node are received from the corresponding transmitter at the node and combined in the switch 80 with channels being dropped and with the pass-through channels, thus forming another band of four wavelengths to be sent to the network.

Figure 3:
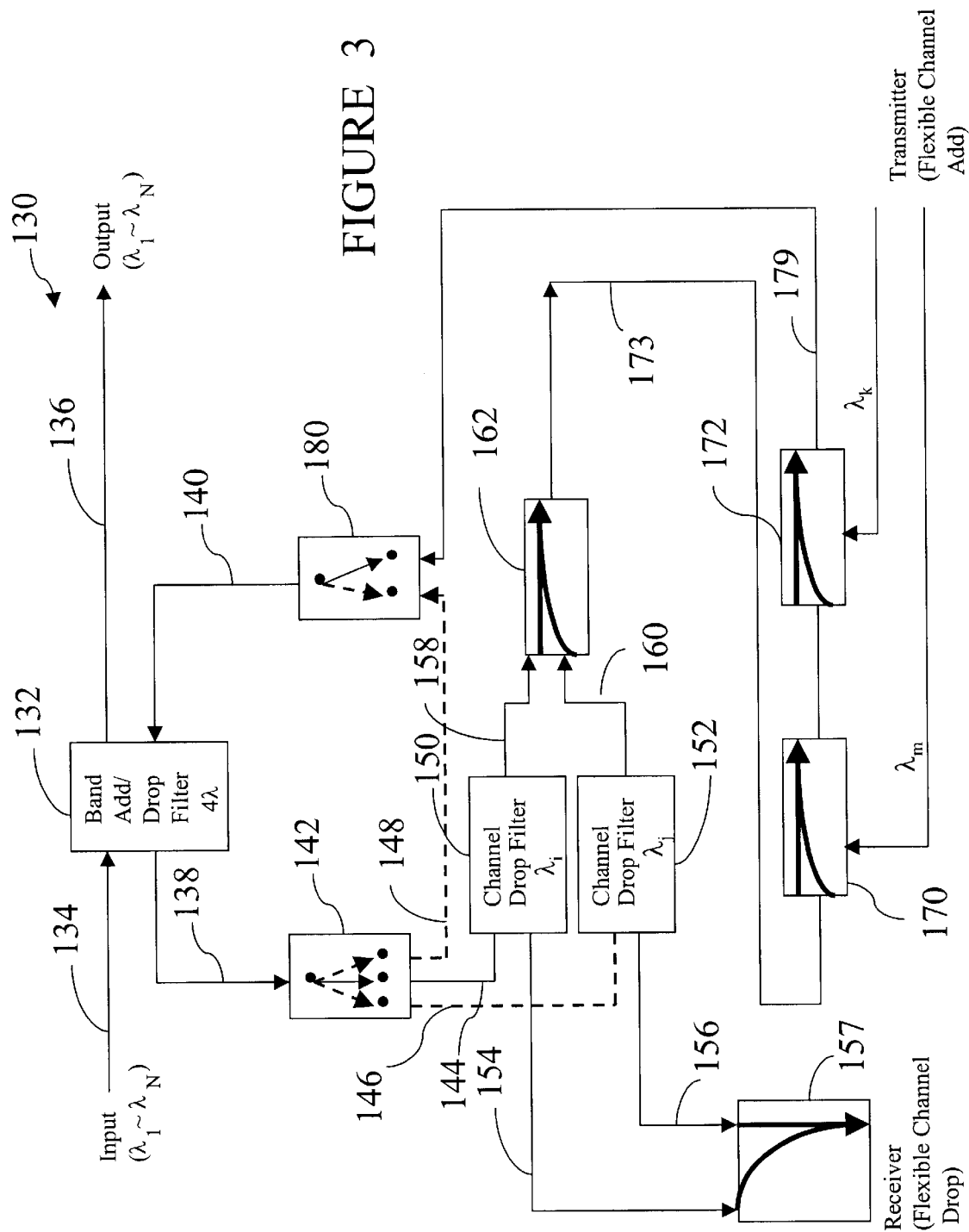
FIG. 3 is a block diagram of another form of an optical add/drop multiplexer/demultiplexer (OADM) used at the node of the network of FIG. 1.

A block diagram of another form of the OADM 130, which can be used at the node of the network 10, is illustrated in FIG. 3. It is similar to the OADM 30 of FIG. 2, and similar elements are designated by same reference numerals incremented by 100. The OADM 130 includes a band add/drop filter 132 for receiving an incoming band of four wavelength channels entering the node, transmitting the band to the other nodes (not shown), and routing the received band inside the node for further processing. The filter 132 has two inputs and two outputs, namely an input 134 for receiving the band, an output 136 for transmitting the band outside the node, an output 138 for dropping the band at the node, and an input 140 for adding the processed band to the filter 132 and further to the network 10.

The output 138 of the band filter 132 is connected to a three-way switch 142 having three outputs 144, 146 and 148. The first output 144 of the switch 142 provides connection of the switch to an optical channel drop filter 150, which is adjusted to one of the wavelengths of the receiver at the node, e.g. to wavelength $\lambda_1$ at node 12. The second output 146 of the three-way switch 142 is connected to another optical channel drop filter 152, which is adjusted to the other wavelength of the receiver at the node, e.g. to wavelength $\lambda_2$ at node 12. Conveniently, the total number of the optical channel drop filters required at each node is equal to the number of the wavelengths utilized by the receiver at the node. Each of the filters 150 and 152 has two outputs (i.e. two pairs of outputs), the first pair of the filters' outputs 154 and 156 is connected to corresponding receiver(s) at the node, e.g. to the receiver $R_1(\lambda_1, \lambda_2)$ at node 12. Conveniently, it can be done by using a coupler 157 as shown in FIG. 3. The other pair of the filters' outputs 158 and 160 is connected to a coupler 162, which combines the two wavelengths dropped at filters 150 and 152 and sends them to optical couplers 170 and 172 from its output 173. The couplers 170 and 172 receive the dropped channels and also add channels $\lambda_k$ and $\lambda_m$ transmitted at the node, the couplers being respectively suitable to operate at the wavelengths of the transmitter at the node, e.g. coupler 170 is adding the wavelength $\lambda_3$, and coupler 172 is adding the wavelength $\lambda_4$ at node 12. The combined dropped and added channels are sent to yet another two-way switch 180 from the output 179 of the coupler 172. Additionally, the switch 180 receives the channel(s) intended to pass through the node from the output 148 of the switch 142, thus completing the formation of the required band of four wavelengths to be sent to the network through the band filter 132. Conveniently, the total number of optical couplers required at the node is equal to the number of wavelengths used by the transmitter at the node, and the total number of optical filters required at the node is equal to the number of wavelengths used by the receiver at the node.

The OADM 130 operates in the following manner. The band of four ($n_1+n_2$) wavelengths is selected by the band add/drop filter 132 and sent to the three-way switch 142 for further selection of individual channels, which are supposed to be dropped at the node, and those channels which are intended to pass through the node and to be returned back to the network. Channels to be dropped are filtered by corresponding channel drop filters 150 and 152 and further sent to the corresponding receivers. Channels to be added at the node are received from the corresponding transmitter at the node, added via corresponding couplers 170 and 172, and combined in the switch 180 with channels being dropped and with the pass-through channels, thus forming another band of four wavelengths to be sent to the network.

Thus, the OADM, comprising a set of "$n_2$" optical filters operating at wavelengths of the receiver and another set of "$n_1$" optical filters or couplers operating at wavelengths of the transmitter and performing multiplexing and demultiplexing of optical channels, is provided.

Figure 4:
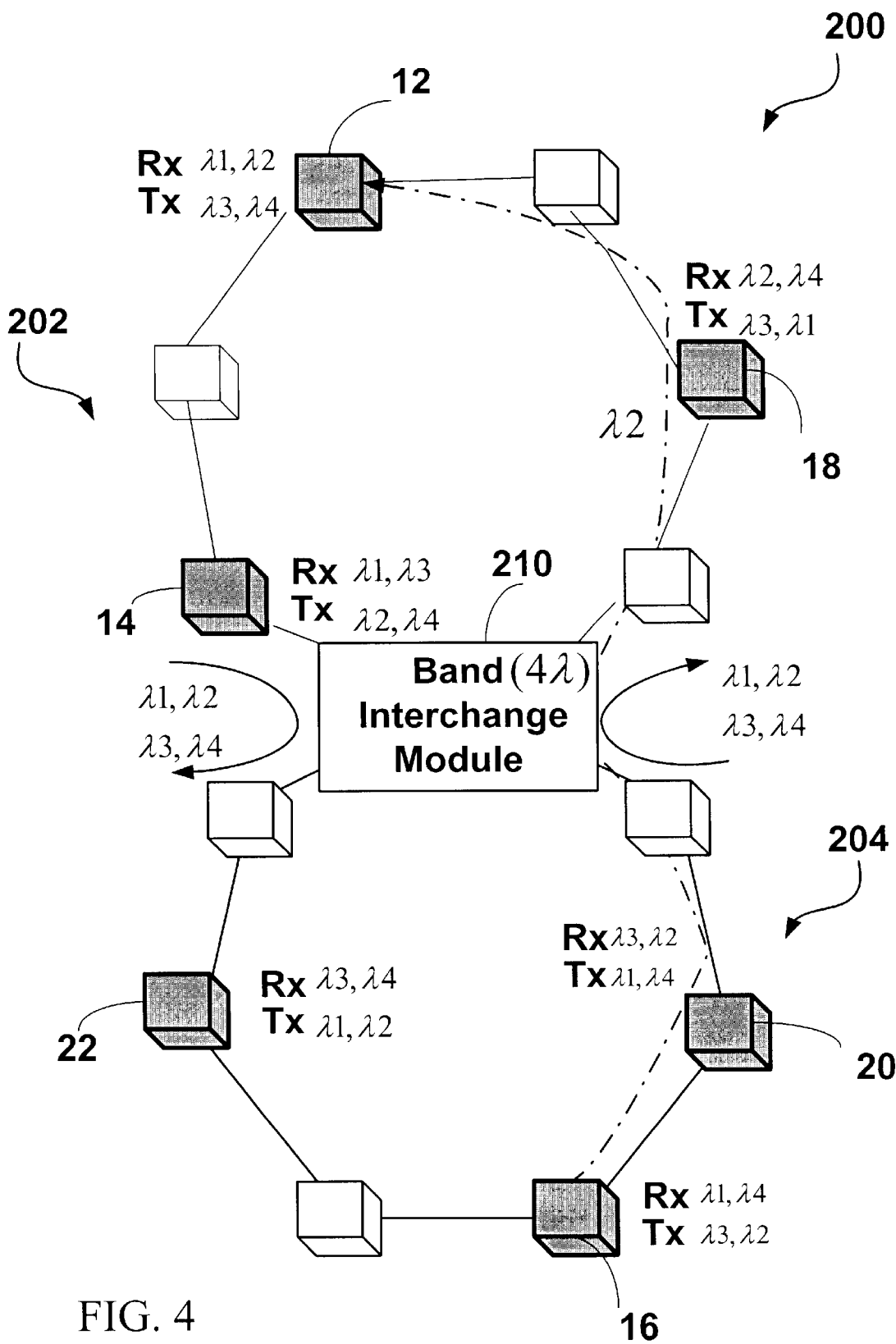
FIG. 4 is a diagram illustrating flexible connections between the rings in a multi-ring network in accordance with the connection scheme of the first embodiment of the invention.
Figure 5:
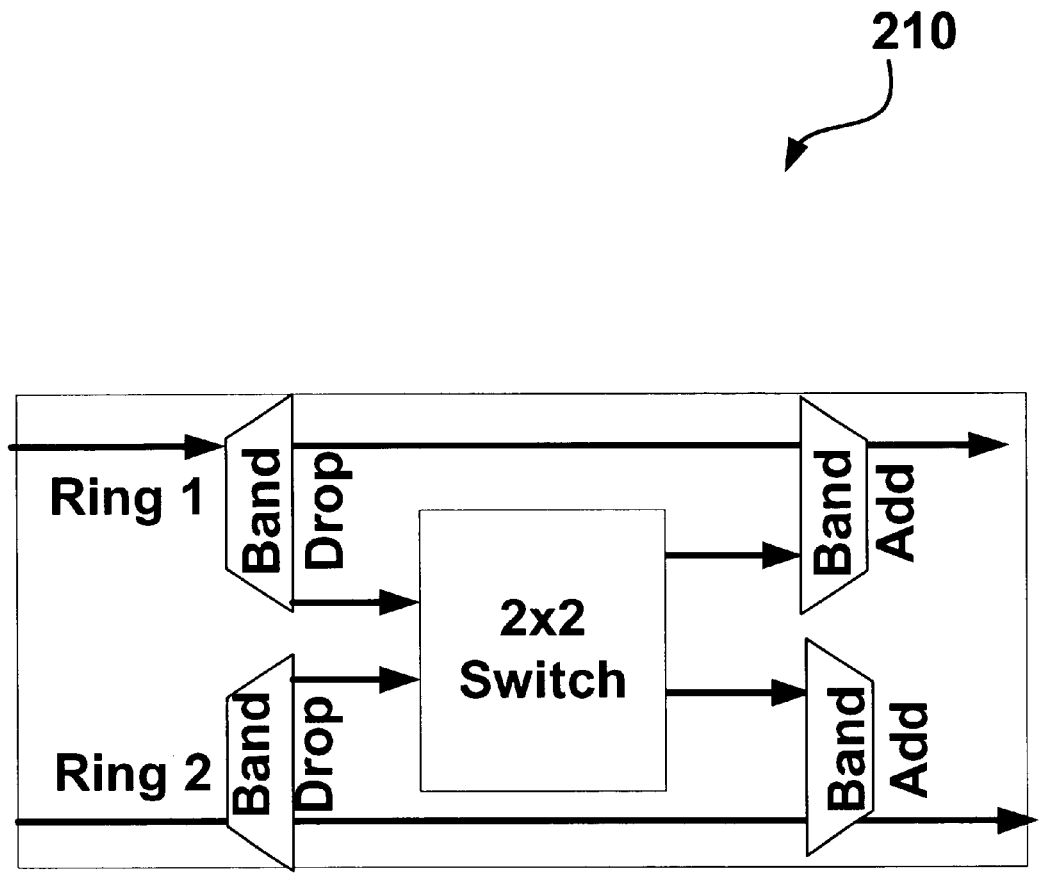
FIG. 5 is a diagram of a band interchange module of FIG. 4.

In a modification to the embodiment, the optical network 10 can be build as an overlay on top of another multi-ring network so that the nodes 12, 14, 15, 18, 20 and 22 of the optical network 10 are also the nodes in the multi-ring network, thereby providing a flexible connection between the nodes in the multi-ring network. This modification of the embodiment is illustrated in FIGS. 4 and 5, which shows a multi-ring network 200 having first and second ring networks 202 and 204. The first ring network 202 includes nodes 12, 14 and 18 of the network 10, and the second ring network 204 includes nodes 16, 20, 22 of the network 10. The exchange of optical bands between the rings 202 and 204 is performed by using a band interchange module 210 suitable for transfer of four wavelengths, the structure of the interchange module being shown in FIG. 5. The band interchange module can be either switchable or fixed. If it is switchable, each ring can have up to six dynamic active nodes, working independently before the switch is turned on. It also allows avoiding the need for a hub node at the border of the rings for traffic exchange, which may become a bottleneck with the growth of traffic. More than two rings in the multi-ring network can be connected in a similar manner, thus providing a flexible connection between the multiple rings.

In the embodiment described above, the network architecture is arranged to provide bi-directional connection between the network nodes. It is also contemplated that assignment of wavelength in the network can be made so that wavelengths of transmitters and receivers at different nodes are arranged so that for any pair of nodes there is one common wavelength which is the same for one of the transmitter and receiver at one node and one of the respective receiver and transmitter at the other node, thus providing a direct connection between the nodes, which can be either a uni-directional connection or a bi-directional connection.

While the embodiment described above illustrates the assignment of wavelengths in the network so that any pair of nodes has two common wavelengths, it is understood that the number of common wavelengths can be higher or lower than the above number depending on the network requirements. One illustrative example of wavelength assignments between the nodes allowing serving more than six nodes is shown in Table 2 below.

TABLE 2

Flexible connection between 8 nodes using 4 wavelengths

| Node | Receiver | Transmitter | Illustration of Connections | Receiver | Transmitter |
|---|---|---|---|---|---|
| #1 | $R_1 (\lambda_1, \lambda_2)$ | $T_1 (\lambda_3, \lambda_4)$ | | $R_1 (\lambda_1, \lambda_2)$ | $T_1 (\lambda_3, \lambda_4)$ |
| #2 | $R_2 (\lambda_1, \lambda_3)$ | $T_2 (\lambda_2, \lambda_4)$ | | $R_2 (\lambda_1, \lambda_3)$ | $T_2 (\lambda_2, \lambda_4)$ |
| #3 | $R_3 (\lambda_1, \lambda_4)$ | $T_3 (\lambda_2, \lambda_3)$ | | $R_3 (\lambda_1, \lambda_4)$ | $T_3 (\lambda_2, \lambda_3)$ |
| #4 | $R_4 (\lambda_2, \lambda_4)$ | $T_4 (\lambda_1, \lambda_3)$ | | $R_4 (\lambda_2, \lambda_4)$ | $T_4 (\lambda_1, \lambda_3)$ |
| #5 | $R_5 (\lambda_2, \lambda_3)$ | $T_5 (\lambda_1, \lambda_4)$ | | $R_5 (\lambda_2, \lambda_3)$ | $T_5 (\lambda_1, \lambda_4)$ |
| #6 | $R_6 (\lambda_3, \lambda_4)$ | $T_6 (\lambda_1, \lambda_2)$ | | $R_6 (\lambda_3, \lambda_4)$ | $T_6 (\lambda_1, \lambda_2)$ |
| #7 | $R_7 (\lambda_1, \lambda_3, \lambda_4)$ | $T_7 (\lambda_1, \lambda_2, \lambda_3)$ | | $R_7 (\lambda_1, \lambda_3, \lambda_4)$ | $T_7 (\lambda_1, \lambda_2, \lambda_3)$ |
| #8 | $R_8 (\lambda_2, \lambda_3, \lambda_4)$ | $T_7 (\lambda_1, \lambda_2, \lambda_4)$ | | $R_8 (\lambda_2, \lambda_3, \lambda_4)$ | $T_7 (\lambda_1, \lambda_2, \lambda_4)$ |

Although the network of the embodiment described above has been implemented by using four wavelengths (channels) in total and supports connections between six nodes, it is contemplated that a similar approach can be applied to a network which would use "$n_1+n_2$" wavelengths in total, and whose total number of nodes would be equal to $N=(n_1+n_2)!/(n_1!n_2!)$. One exemplary illustration of using more than four wavelength is shown in table 3 below, which illustrates how to provide connections between 20 nodes by using six different wavelengths.

TABLE 3

Fully flexible connection between 20 Nodes using 6 wavelengths

| Rx λ6 λ5 λ4 | Tx λ1 λ2 λ3 | Rx λ6 λ5 λ4 | Tx λ1 λ2 λ3 |
|---|---|---|---|
| Rx λ6 λ5 λ3 | Tx λ1 λ2 λ4 | Rx λ6 λ5 λ3 | Tx λ1 λ2 λ4 |
| Rx λ6 λ3 λ4 | Tx λ1 λ2 λ5 | Rx λ6 λ3 λ4 | Tx λ1 λ2 λ5 |
| Rx λ5 λ4 λ3 | Tx λ1 λ2 λ6 | Rx λ5 λ4 λ3 | Tx λ1 λ2 λ6 |
| Rx λ6 λ5 λ2 | Tx λ1 λ3 λ4 | Rx λ6 λ5 λ2 | Tx λ1 λ3 λ4 |
| Rx λ6 λ3 λ2 | Tx λ1 λ5 λ4 | Rx λ6 λ3 λ2 | Tx λ1 λ5 λ4 |
| Rx λ5 λ4 λ2 | Tx λ1 λ6 λ3 | Rx λ5 λ4 λ2 | Tx λ1 λ6 λ3 |
| Rx λ6 λ4 λ2 | Tx λ1 λ5 λ3 | Rx λ6 λ4 λ2 | Tx λ1 λ5 λ3 |
| Rx λ4 λ3 λ2 | Tx λ1 λ5 λ6 | Rx λ4 λ3 λ2 | Tx λ1 λ5 λ6 |
| Rx λ5 λ3 λ2 | Tx λ1 λ6 λ4 | Rx λ5 λ3 λ2 | Tx λ1 λ6 λ4 |
| Rx λ1 λ2 λ3 | Tx λ6 λ5 λ4 | Rx λ1 λ2 λ3 | Tx λ6 λ5 λ4 |
| Rx λ1 λ2 λ4 | Tx λ6 λ5 λ3 | Rx λ1 λ2 λ4 | Tx λ6 λ5 λ3 |
| Rx λ1 λ2 λ5 | Tx λ6 λ3 λ4 | Rx λ1 λ2 λ5 | Tx λ6 λ3 λ4 |
| Rx λ1 λ2 λ6 | Tx λ5 λ4 λ3 | Rx λ1 λ2 λ6 | Tx λ5 λ4 λ3 |
| Rx λ1 λ3 λ4 | Tx λ6 λ5 λ2 | Rx λ1 λ3 λ4 | Tx λ6 λ5 λ2 |
| Rx λ1 λ5 λ4 | Tx λ6 λ3 λ2 | Rx λ1 λ5 λ4 | Tx λ6 λ3 λ2 |
| Rx λ1 λ6 λ3 | Tx λ5 λ4 λ2 | Rx λ1 λ6 λ3 | Tx λ5 λ4 λ2 |
| Rx λ1 λ5 λ3 | Tx λ6 λ4 λ2 | Rx λ1 λ5 λ3 | Tx λ6 λ4 λ2 |
| Rx λ1 λ5 λ6 | Tx λ4 λ3 λ2 | Rx λ1 λ5 λ6 | Tx λ4 λ3 λ2 |
| Rx λ1 λ6 λ4 | Tx λ5 λ3 λ2 | Rx λ1 λ6 λ4 | Tx λ5 λ3 λ2 |

Figure 6:
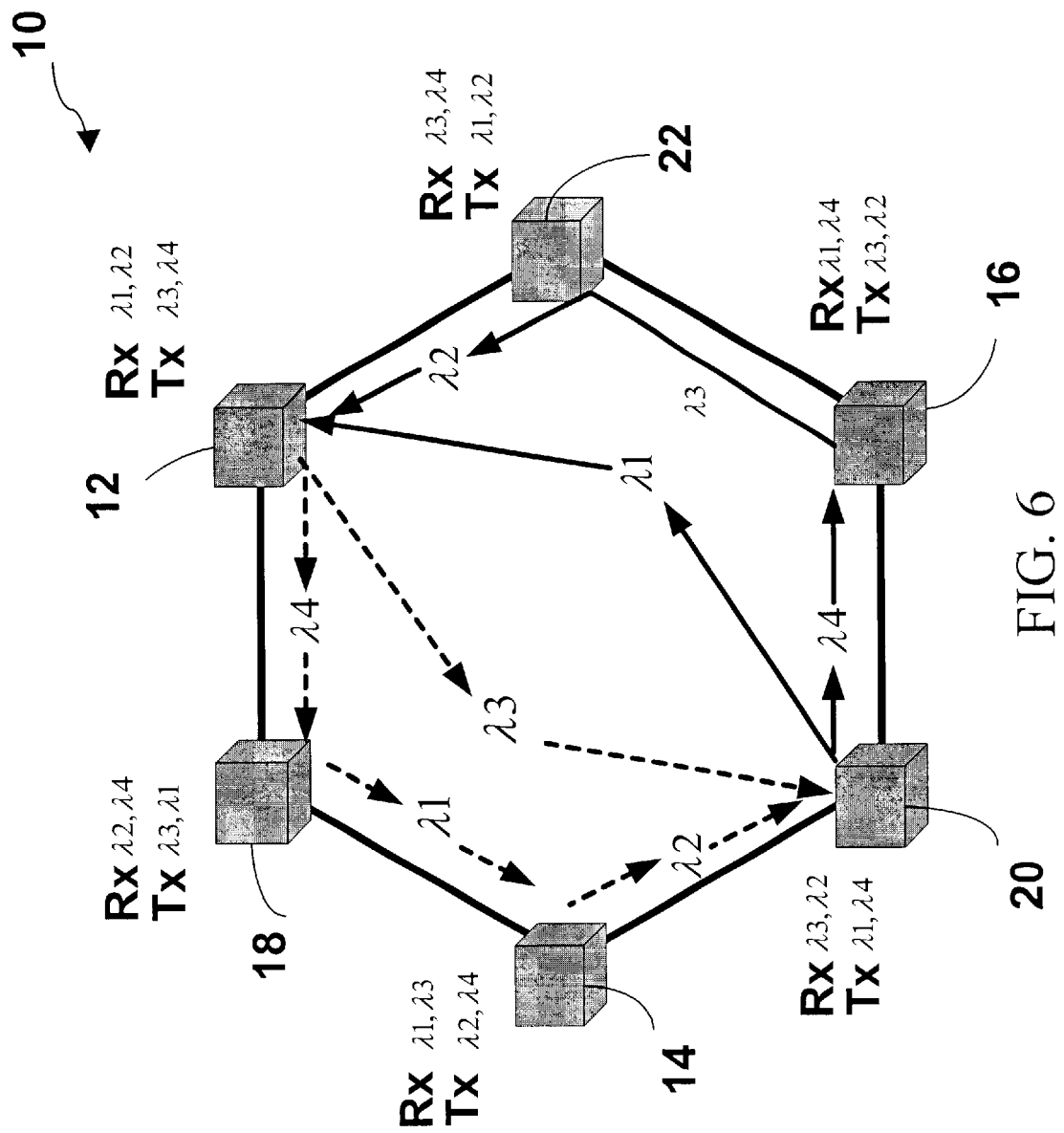
FIG. 6 is a diagram illustrating more than one connection between the nodes by using wavelength converters.

In a modification to the embodiment described above, it is possible to set up two or more connections between the nodes at the same time if the intermediate nodes have wavelength converters. The nodes, which provide the wavelength conversion, operate as hops, and the additional cost involved is the cost of trasponders at each node. By a way of example, FIG. 6 illustrates establishing of two connections between the nodes 12 and 20, wherein the first connection is established by direct communication between the nodes at the wavelength $\lambda_3$, and the second connection is established through the nodes 18 and 14 by using the wavelength conversions $\lambda_4$ to $\lambda_1$ and $\lambda_1$ to $\lambda_2$ respectively. Similarly, two connections from the node 20 to the node 12 can be done at the wavelength $\lambda_1$ (direct connection) and via nodes 16 and 22 using wavelength converters as illustrated in FIG. 6. The OADM structure shown in FIGS. 2 and 3 has to be slightly modified to support adding and dropping of two channels, otherwise being similar to that of FIGS. 2 and 3.

Various combinations and arrangements of components in the network may also be contemplated. For example, fixed wavelength devices (transmitters and/or receivers) at certain nodes may be replaced with tunable devices to provide additional flexibility of network connections.

Although the approach to network architecture has been described with regard to an optical mesh network, alternatively, it can be applied to other types of networks, e.g. ring networks, or any other known optical network, which would require achieving flexible connections by using limited network resources.

Although specific embodiments of the invention have been described in detail, it will be apparent to one skilled in the art that variations and modifications to the embodiments may be made within the scope of the following claims.

What is claimed is:

1. An optical network, comprising:
a plurality of N nodes;
each node has a transmitter for transmitting a set of "$n_1$" wavelengths (transmitter set), and a receiver for receiving a set of "$n_2$" wavelengths (receiver set), the transmitter and receiver sets are misarranged so as to differ by at least one wavelength, and the total number of the wavelengths used in the network is equal to "$n_1+n_2$";
the wavelengths of transmitters and receivers at different nodes are arranged so that for any pair of nodes there is at least one common wavelength which is the same for the transmitter at one node and the receiver at the other node, thus providing a direct connection between the nodes; and
for any pair of nodes there are at least two common wavelengths, the first and second common wavelengths, the first wavelength being the same for the transmitter at one node and the corresponding receiver at the other node in the pair, and the second wavelength being the same for the receiver at one node and the corresponding transmitter at the other node in the pair.

2. An optical network as described in claim 1, wherein the total number of nodes is equal to $N=(n_1+n_2)!/(n_1!n_2!)$.

3. An optical network as described in claim 1, wherein the transmitter set and receiver set have different number of wavelengths, i.e. $n_1 \neq n_2$.

4. An optical network as described in claim 3, wherein the wavelengths of transmitter set are different from the wavelengths receiver set.

5. An optical network as described in claim 1, wherein the transmitter set and receiver set have same number of wavelengths, i.e. $n_1=n_2=n$.

6. An optical network as described in claim 5, wherein the wavelengths of the transmitter set are different from the wavelengths the receiver set.

7. An optical network as described in claim 5, wherein the total number of nodes is equal to $N=(2n)!/(n!n!)$.

8. An optical network as described in claim 5, wherein for any pair of nodes the number of common wavelengths is not more than "n−1".

9. An optical network as described in claim 1, wherein the number "$n_1$" of wavelengths in the transmitter set is the same for all nodes.

10. An optical network as described in claim 1, wherein the number "$n_1$" of wavelengths in the transmitter set varies for different nodes.

11. An optical network as described in claim 1, wherein at least one of the transmitter and receiver is a fixed wavelength device.

12. An optical network as described in claim 1, wherein both the transmitter and receiver are fixed wavelength devices.

13. An optical network as described in claim 1, wherein at least one of the transmitter and receiver is a tunable wavelength device.

14. An optical network as described in claim 1, the network having one of the following network topologies:
mesh, ring, multi-ring, bus, and star topology.

15. An optical network as described in claim 1, the optical network being built as an overlay of a multi-ring network so that the nodes of the optical network are the nodes in the multi-ring network, thereby providing a flexible connection between the nodes in the multi-ring network.

16. A node for an optical network, comprising a transmitter for transmitting a set of "$n_1$" wavelengths, and a receiver for receiving another set of "$n_2$" wavelengths, the transmitter and receiver sets are misarranged so as to differ by at least one wavelength, and the total number of the wavelengths to be used in the network being equal to "$n_1+n_2$";
the wavelengths of the transmitter and receiver at the said node being arranged so that for any pair of nodes in the network, where the said node is one of the two nodes in the pair, there is at least one common wavelength which is the same for one of the transmitter and receiver at the said node and one of the respective receiver and transmitter at the other node in the pair; and
the wavelengths of the transmitter and receiver at the node are arranged so that for any pair of nodes in the network, where the said node is one of the two nodes in the pair, there are at least two common wavelengths, the first and second common wavelengths, the first wavelength is the same for the transmitter at the said node and the corresponding receiver at the other node in the pair, and the second wavelength is the same for the receiver at the said node and the corresponding transmitter at the other node in the pair.

17. A node as described in claim 16, further comprising an optical add/drop multiplexer/demiltiplexer including means for dropping wavelengths from the network to the node and means for adding wavelengths to the network from the node.

18. A node as described in claim 17, wherein the means for dropping wavelengths comprises a set of "$n_2$" optical filters suitable for operation at the wavelengths of the receiver set.

19. A node as described in claim 17, wherein the means for adding wavelengths comprises a set "$n_1$" optical filters suitable for operation at the wavelengths of the transmitter set.

20. A node as described in claim 17, wherein the means for adding wavelengths comprises a set of "$n_1$" optical couplers suitable for operation at the wavelengths of the transmitter set.

21. A node as described in claim 16, further comprising a wavelength converter.

22. An optical add/drop multiplexer/demultiplexer for a node of claim 16, comprising:
means for dropping wavelengths from the network to the node comprising a set of "$n_2$" optical filters suitable for operation at the wavelengths of the receiver set; and
means for adding wavelengths to the network from the node comprising one of the following:
a set "$n_1$" optical filters suitable for operation at the wavelengths of the transmitter set; and
a set of "$n_1$" optical couplers suitable for operation at the wavelengths of the transmitter set.

23. In an optical network having a plurality of nodes, a method of providing direct connections between the nodes, comprising the steps of:
for each node, providing a transmitter for transmitting a set of "$n_1$" wavelengths, and a receiver for receiving another set of "$n_2$" wavelengths, and selecting the wavelengths of the transmitter and the receiver so as to differ by at least one wavelength;
arranging the total number of wavelengths to be used in the network to be equal to "$n_1+n_2$"; and
selecting wavelengths of transmitters and receivers at different nodes so that for any pair of nodes there is at least one common wavelength which is the same for one of the transmitter and the receiver at one node, and one of the respective receiver and transmitter at the other node, thus providing a direct connection between the nodes;
wherein the step of selecting the wavelengths of transmitters and receivers at different nodes is performed so as to provide that for any pair of nodes there are at least two common wavelengths, the first and second common wavelengths, the first wavelength is the same for the transmitter at one node and the corresponding receiver at the other node in the pair, and the second wavelength is the same for the receiver at one node and the corresponding transmitter at the other node in the pair.

24. A method as described in claim 23, wherein $n_1=n_2=n$, and selecting the wavelengths of the transmitter and the receiver so as to be different from each other.

* * * * *